United States Patent [19]

Chu et al.

[11] Patent Number: 5,550,092
[45] Date of Patent: Aug. 27, 1996

[54] CERAMIC DIELECTRICS COMPOSITIONS

[75] Inventors: Mike S.-H. Chu, Lewiston, N.Y.; John Bultitude, Banbury; Christopher Hood, Reading, both of United Kingdom

[73] Assignee: Tam Ceramics Inc., Niagara Falls, N.Y.

[21] Appl. No.: 386,935

[22] Filed: Feb. 10, 1995

[51] Int. Cl.$^6$ ................................... C04B 35/46
[52] U.S. Cl. ........................................ 501/137
[58] Field of Search ............................... 501/137

[56] References Cited

U.S. PATENT DOCUMENTS

| | | | |
|---|---|---|---|
| 3,028,248 | 4/1962 | Glaister | 29/25.41 |
| 3,764,529 | 10/1973 | Matsuo et al. | 252/1 |
| 4,054,531 | 10/1977 | Takahashi et al. | 252/63.2 |
| 4,148,853 | 4/1979 | Schuber | 264/37 |
| 4,347,167 | 8/1982 | Payne et al. | 252/520 |
| 4,459,364 | 7/1984 | McSweeney et al. | 501/137 |
| 4,540,676 | 9/1985 | Chu et al. | 501/138 |
| 4,816,430 | 5/1989 | Chu | 501/137 |
| 4,882,305 | 11/1989 | Chu et al. | 501/138 |
| 4,900,703 | 2/1990 | Ono et al. | 501/136 |
| 5,029,042 | 7/1991 | Dean | 361/321 |
| 5,030,386 | 7/1991 | Saxton et al. | 252/520 |
| 5,128,289 | 7/1992 | Wilson | 501/137 |

FOREIGN PATENT DOCUMENTS

| | | | |
|---|---|---|---|
| 58-028103 | 2/1983 | Japan | C04B 35/46 |
| 59-020905 | 2/1984 | Japan | C04B 35/46 |
| 59-152265 | 8/1984 | Japan | C04B 35/46 |
| 59-154703 | 9/1984 | Japan | C04B 35/46 |
| 5-8015078 | 1/1993 | Japan | C04B 35/46 |
| 948973 | 8/1982 | U.S.S.R. | C04B 35/46 |
| 1527060 | 10/1978 | United Kingdom | H01L 29/95 |

*Primary Examiner*—Deborah Jones
*Attorney, Agent, or Firm*—Watson Cole Stevens Davis, P.L.L.C.

[57] ABSTRACT

A sinterable ceramic composition which comprises a barium titanate based dielectric precursor powder which has a temperature coefficient of capacitance, TC, of ±15% over the temperature range −55° to 125° C., in admixture with from 0.25 to 2.0% by weight of an additive which is selected from the group consisting of $ZrSiO_4$, $Al_2O_3$, $SiO_2$, precursors therefor and mixtures thereof, the composition having an average particle size in the range of from 0.6 to 0.8 micrometers and, when fired, having a dielectric constant of above 2500, a TC of ±15% over the temperature range of −55° to +125° C. and a porosity of less than 0.7% with no pores greater than 3.5 micrometers average diameter.

8 Claims, 2 Drawing Sheets

CERAMIC DIELECTRICS COMPOSITIONS

BACKGROUND OF THE INVENTION

The present invention relates to ceramic dielectric compositions and, in particular, to ceramic dielectric compositions which, when sintered, have dielectric constants between 2400 and 3100, low dissipation factor (DF), e.g., below about 2%, high insulation resistance capacitance (RC) products, e.g. above 5000 ohm—farad at 25° C. and above 1000 ohm-farad at 125° C.; stable temperature coefficients (TC), in which the dielectric constant does not alter from in base value at 25° C. by more than 25% over a temperature range from −55° to 125° C.; a near zero porosity level; and an average particle size of less than 0.8 microns.

The ceramic compositions of the present invention are useful in manufacturing multilayer ceramic capacitors (hereinafter MLC) which require a high capacitance and which typically have a relatively small size. The ultra low porosity of these compositions, combined with the submicron powder particle size, enables thinner layers to be made in the MLC, which results in a higher capacitance and reliability of the device. MLCs are commonly made by casting or otherwise forming insulating layers of a dielectric ceramic powder upon which conducting metal electrode layers, usually consisting of a palladium/silver alloy, are deposited. The ceramic composition must then be fired at temperatures greater than or equal to 1280° C. to form the MLC device.

It is well known that temperature stable ceramic dielectrics may be prepared by mixing pure barium titanate with other minor additives for control of the final dielectric properties. Using commercially available high purity barium titanate produced by chemical coprecipitation by the solid state method, downward Curie shifters can be added to shift the Curie peak of the $BaTiO_3$ from about 125° C. to room temperature where it is desirable to have a high dielectric constant. The stability of the dielectric constant over a wide range of temperatures, its insulation resistance, reliability, and other factors influence the final ingredients to be used in a dielectric composition.

Typically barium titanate powders are normally physically characterized as having an average particle sizes of greater than 1.0 micrometers in diameter. This can be achieved by either air impact milling or wet milling. As MLC technology is going towards greater miniaturization, it is more desirable to have thinner dielectric layers which will achieve a higher capacitance with the same design. Submicron particle size powders are desirable for thinner and thinner layers. Typical ceramic dielectric compositions which are disclosed in the prior art, such as U.S. Pat. Nos. 4,882,305 and 4,816,430, lose their stability, especially TC characteristics, as the particle size of the dielectric powder is reduced to less than 0.7 micrometers. Also, there is a small population of large size pores apparent in MLCs made with dielectric powders of the standard particle size. Although these pores do not affect the electrical properties and reliability of MLCs having dielectric layers of thickness 25 micrometers, the large size pores become increasingly undesirable as the dielectric layers become thinner and thinner. These large pores of approximately 5 to 7 micrometers in size will eventually cause problems of electrical degradation and reliability.

It is known in the art that when the particle size of barium titanate based compositions is reduced by milling, an improvement of porosity is achieved. However, currently available milling methods have side affects such as a noticeable clockwise rotation of the TC curve. Attempts to counter this effect by varying the ingredients of a standard high fire X7R composition (such as the ratio or level of the $Nb_2O_5$/CoO additives) have been unsuccessful to date. A high fire X7R prior art composition was studied but could not maintain a stable X7R TC, which is that the capacitance does not vary by more than ±15% over the temperature range of −55° C. to 125° C. when the particle size was reduced to below 0.8 micrometers. A typical example is given below.

TABLE I

| Average particle size (μm) | 1.3 | 1.02 | 0.8 | 0.72 | 0.58 |
|---|---|---|---|---|---|
| Dielectric Constant | 3458 | 3595 | 3767 | 4047 | 4386 |
| TC (%) @ | | | | | |
| −55° C. | −2.60 | −0.8 | −6.4 | −18.5 | −34.9 |
| 25° C. | 0 | 0 | 0 | 0 | 0 |
| 85° C. | −4.4 | −6.5 | −10.4 | −16.6 | −23.4 |
| 105° C. | −3.2 | −6.1 | −11.3 | −19 | −29.4 |
| 125° C. | 7.7 | 2.3 | −6.1 | −17.1 | −32.1 |

Without changing the dielectric composition, the dielectric properties listed above indicate that when the average particle size is reduced to less than 0.8 micrometers the TC can no longer meet the Electronic Industry Association X7R TC specification. It is noted that the data given above in Table 1 are for disc ceramic capacitors. It is well known to those who are familiar with the art that the TC of a ceramic multilayer capacitor is expected to be at least 4% more negative on the high temperature side due to the reaction of the ceramic with the internal electrodes and due to the dielectric thickness. Therefore, based on Table 1 data, powders with a particle size of less than 0.8 micrometers will have a TC lower than −15% when applied in MLCs even though the TC is within −15% in the disc.

SUMMARY OF THE INVENTION

We have now developed a submicron particle size high fire X7R ceramic dielectric composition which exhibits dielectric constant stability over a wide temperature range, which will exhibit a stable temperature coefficient of capacitance over the temperature range of −55° to 125° C. when milled to an average submicron particle size of less than 0.8 micrometers and which has reduced porosity in the fired ceramic for the purpose of providing thinner dielectric layers and higher reliability.

Accordingly, in one aspect of the present invention there is provided a sinterable ceramic composition which comprises a barium titanate based dielectric precursor powder which has a temperature coefficient of capacitance, TC, of ±15% over the temperature range −55° to 125° C., in admixture with from 0.25 to 2.0% by weight of an additive which is selected from the group consisting of $ZrSiO_4$, $Al_2O_3$, $SiO_2$, precursors therefor and mixtures thereof, the composition having an average particle size in the range of from 0.6 to 0.8 micrometers and, when fired, having a dielectric constant of above 2500, a TC of ±15% over the temperature range of −55° to +125° C. and a porosity of less than 0.7% with no pores greater than 3.5 micrometers average diameter.

In another aspect the present invention provides a method for the preparation of a sintered composition having an average particle size in the range of from 0.6 to 0.8 micrometers and, when fired, having a dielectric constant of above 2500, a TC of ±15% over the temperature range −55° to 125° C. and a porosity of less than 0.7% with no pores greater than 3.5 micrometers, which method comprises milling a barium titanate precursor powder having a temperature coefficient of capacitance, TC, of ±15% over the temperature range −55° to 125° C. and having an average particle size of above 0.8 micrometers with from 0.25 to 2% by weight of an additive which is selected from the group consisting of $ZrSiO_4$, $Al_2O_3$, $SiO_2$, precursors therefor and mixtures thereof to an average particle size of from 0.6 to 0.8 micrometers.

DETAILED DESCRIPTION OF THE INVENTION

Figure 1:
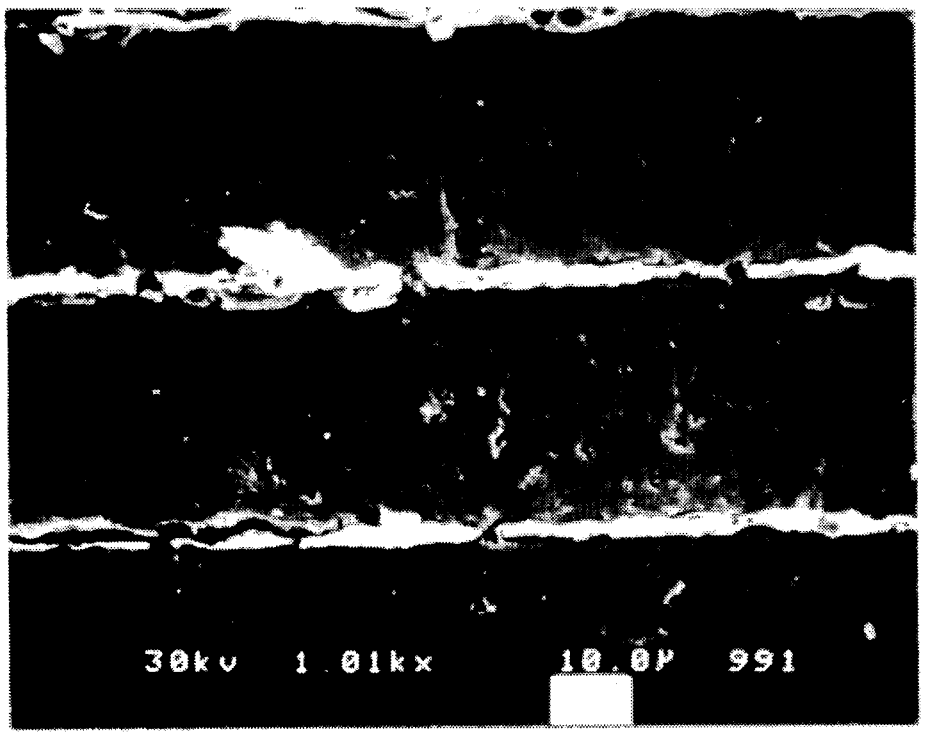
FIG. 1 is an SEM of a polished section of an MLC made with a standard K4000 X7R barium titanate dielectric material.

The compositions of the present invention, when fired, have a porosity of less than 0.7% with no pores greater than 3.5 micrometers average diameter. In order to determine the degree of porosity, number of pores and pore size distributions, polished sections of the sintered compositions, for example as MLCs, are prepared and their microstructures analysed by SEM coupled with an image analyser.

The compositions of the present invention preferably include the additive $ZrSiO_4$, $Al_2O_3$, $SiO_2$, or precursors therefor, or mixtures thereof, in an amount of from 0.5 to 1.0% by weight.

The compositions of the present invention, when fired, preferably have a dielectric constant in the range of from 2400 to 3100 at 25° C., a dissipation factor of less than 2% and an insulation resistance and capacitance produce of about 5000 ohm-farads at 25° C. and about 1000 ohm-farads at 125° C.

The composition of the present invention has an average particle size in the range of from 0.6 to 0.8 micrometers, preferably about 0.7 micrometers.

The barium titanate precursor composition which is used in the present invention has a temperature coefficient of capacitance, TC, of ±15% over the temperature range −55° to +125° C. The precursor composition preferably is of high purity and to attain the desired TC value includes therein additives of niobium pentoxide ($Nb_2O_5$), cobalt oxide (CoO), and manganese oxide (MnO). As previously described herein these precursor compositions may be prepared according to the teaching of U.S. Pat. Nos. 4,882,305 and 4,816,430. The preferred stoichiometric ratio for the barium titanate is about 0.995.

In carrying out the method of the present invention the barium titanate precursor powder and the additive are milled together using conventional milling procedures, preferably for a period of time of from 2 to 8 hours.

The ceramic compositions of the present invention may be formed into slurries with appropriate binder compositions for the preparation of tapes from which MLCs are prepared by conventional techniques. It should be noted that any conventional ceramic binder composition may be used in this invention which is compatible with the powders used for this invention and which provides a vehicle for dispersing the ceramic particles and holding them together when the solvent is removed. Suitable binder compositions are described in "Ceramic Processing Before Firing", Ch. 19. G. Y. Onoda, Ir., et al John Wiley & Sons (1978). Polyvinyl alcohol in water and polyvinyl butyl in methyl ethyl ketone alcohol are examples of other suitable equitable binder compositions.

The present invention will be more particularly described with reference to the following Examples.

EXAMPLES 1 to 12

Approximately 650 grams of a commercially available K4200 X7R powder, such as TAMTRON X7R412H, were added with 6.5 grams or 13.0 grams of an additive selected from $ZrSiO_4$ (zirconium silicate), $Al_2O_3$, $SiO_2$ and $CaZrO_3$ to 800 cc of distilled water, and 5000 grams of 0.5 cm diameter yttria stabilized $ZrO_2$ media in a plastic ball mill jar. The compositions were milled for 2 or 8 hours. The average particle size of the above powder compositions was about 1.0 micrometers after 2 hours milling and about 0.7 micrometers after 8 hours milling. The wet slurries were then dried into a cake and ground with a mortar and pestle. 2.4 to 4.0 cc of a binder solution including 30 wt % corn syrup solids and 70 wt % distilled water was mixed with 30 grams of each ceramic powder in a mortar and pestle which was granulated through a 40 mesh nylon screen. Discs of the resultant mixture having a diameter of 1.27 cm and a thickness of 0.1 to 0.15 cm were pressed at a pressure of about 38,000 pounds per square inch in a stainless steel disc. The discs were placed on a stabilized zirconia setter and fired at 1300° to 1340° C. for 2 hours. After cooling, silver electrodes were painted on the discs which were then fired at 815° C. to sinter the electrodes. The capacitance (C), the dissipation factor (DF), and the capacitance change with temperature as compared to the reference at 25° C. were then measured with a model HP4274A capacitance bridge at 1 KHz measurement frequency, from −55° to 125° C. at about 20° C. intervals. The dielectric constant K, of each sample was then calculated from the fundamental capacitance equation:

$$K = 5.66 * Ct/D^2$$

where

K=dielectric constant of the sample t=thickness of the disc in inches

D=diameter of the disc in inches

C=capacitance of the disc in picofarads.

It is noted that TAMTRON X7R412H is a commercially available dielectric powder. It is manufactured by blending high purity barium titanate, technical grade fine particle size niobium pentoxide, and technical grade fine particle size cobalt oxide. Details have been disclosed in U.S. Pat. No. 4,882,305.

Table II lists the dielectric properties of the above disc samples. It demonstrates that the addition of $ZrSiO_4$, $Al_2O_3$ and $SiO_2$ in small amounts stabilizes the TC even when the particle size of the powder is reduced to about 0.7 micrometers (Compare Examples 1, 2, 3, 4, 5, 6, 7 and 8). The addition of $CaZrO_3$ does not show any advantage (Examples 9, 10, 11 and 12).

TABLE II

|  | % dopant | milling time | K, 1 KHz | % DF | TC @ −55° C. | TC @ 85° C. | TC @ 105° C. | TC @ 125° C. |
|---|---|---|---|---|---|---|---|---|
| Example 1 | 0 | 2 | 4015 | 1.01 | −8.3 | −7.4 | −8.0 | 0.0 |
| Example 2 | 0 | 8 | 4291 | 1.16 | −22.7 | −13.5 | −15.6 | −11.9 |
| Example 3 | 1% ZrSiO$_4$ | 2 | 3038 | 0.91 | −7.1 | −0.5 | 0.3 | 6.6 |
| Example 4 | 1% ZrSiO$_4$ | 8 | 3084 | 0.98 | −8.2 | −5.2 | −5.9 | −2.2 |
| Example 5 | 1% Al$_2$O$_3$ | 2 | 3107 | 0.88 | −6.3 | −1.8 | −1.1 | 6.4 |
| Example 6 | 1% Al$_2$O$_3$ | 8 | 3163 | 0.98 | −9.0 | −4.9 | −5.4 | −0.8 |
| Example 7 | 1% SiO$_2$ | 2 | 3019 | 0.88 | −7.9 | −2.3 | −2.2 | 3.2 |
| Example 8 | 1% SiO$_2$ | 8 | 3113 | 0.98 | −10.5 | −5.8 | −6.9 | −3.8 |
| Example 9 | 1% CaZrO$_3$ | 2 | 3695 | 0.96 | −4.4 | −5.7 | −5.7 | 2.3 |
| Example 10 | 1% CaZrO$_3$ | 8 | 4477 | 1.38 | −28.3 | −19.8 | −25.4 | −25.9 |
| Example 11 | 2% CaZrO$_3$ | 2 | 3576 | 0.97 | −4.0 | −6.6 | −7.3 | −1.6 |
| Example 12 | 2% CaZrO$_3$ | 8 | 4234 | 1.22 | −21.9 | −15.5 | −18.8 | −16.6 |

EXAMPLES 13 to 22

Using the same mixing and milling procedures as detailed above for Examples 1 to 12 but using another commercially available high fire X7R composition, TAMTRON X7R402H, the compositions of Examples 13 to Example 22 were prepared so that the amount of ZrSiO$_4$ was from 0 to 5 weight percent. The compositions were milled for 10 hours so that the average powder particle size was about 0.7 micrometers. It is to be noted that TAMTRON X7R402H was manufactured by blending high purity barium titanate, technical grade fine particle size niobium pentoxide, technical grade fine particle size cobalt oxide, and high purity technical grade manganese carbonate. Details have been disclosed in U.S. Pat. No. 4,816,430.

Table III lists the dielectric properties of discs prepared from the various compositions according to the procedure of Examples 1 to 12. The Table indicates that when the ZrSiO$_4$ addition level is less than 0.25 weight %, such as Example 13, the TC is not stable. When the ZrSiO$_4$ addition level is above 2.0 weight %, such as Examples 20, 21 and 22, either the dielectric constant is low or the TC is not stable, or both. They are, therefore, outside the scope of the present invention.

EXAMPLES 23 to 32

Using the same procedure as described in Examples 1 to 12 using a commercially available powder TAMTRON X7R412H, the compositions of Examples 23 to 32 were prepared with additions of 0 to 5.0 weight percent of ZrSiO$_4$ and tested in the same way as for Examples 1 and 2. Table IV lists the results. It indicates that when the ZrSiO$_4$ addition is less than 0.25 weight percent, such as Example 23, the TC is not stable. When the ZrSiO$_4$ addition level is above 2.0 weight percent, such as Examples 30, 31 and 32, either the dielectric constant is low or the TC is not stable, or both.

TABLE III

|  | % ZrSiO$_4$ | K at 1 KHz | % DF | TC @ −55° C. | TC @ 85° C. | TC @ 105° C. | TC @ 125° C. |
|---|---|---|---|---|---|---|---|
| Example 13 | 0 | 3758 | 0.9 | −9.7 | −9.8 | −11.0 | −6.5 |
| Example 14 | 0.25 | 3337 | 0.83 | −5.4 | −6.8 | −7.8 | −3.3 |
| Example 15 | 0.5 | 3156 | 0.82 | −4.8 | −5.2 | −5.7 | −1.6 |
| Example 16 | 0.75 | 2972 | 0.84 | −4.7 | −3.9 | −4.3 | −0.5 |
| Example 17 | 1.0 | 2814 | 0.85 | −4.9 | −3.0 | −3.3 | 0.3 |
| Example 18 | 1.5 | 2557 | 0.86 | −5.5 | −2.0 | −2.3 | 0.6 |
| Example 19 | 2.0 | 2341 | 0.84 | −5.7 | −1.8 | −2.3 | −0.1 |
| Example 20 | 3.0 | 2023 | 0.85 | −3.6 | −3.7 | −4.9 | −4.0 |
| Example 21 | 4.0 | 1824 | 0.86 | 2.7 | −9.5 | −12.1 | −12.6 |
| Example 22 | 5.0 | 1746 | 0.92 | 12.6 | −19.8 | −24.8 | −27.6 |

TABLE IV

|  | % ZrSiO$_4$ | K at 1 KHz | % DF | TC @ −55° C. | TC @ 85° C. | TC @ 105° C. | TC @ 125° C. |
|---|---|---|---|---|---|---|---|
| Example 23 | 0 | 4237 | 1.12 | −22.8 | −13.9 | −16.0 | −12.3 |
| Example 24 | 0.25 | 3693 | 1.00 | −14.7 | −10.3 | −11.7 | −7.7 |
| Example 25 | 0.5 | 3452 | 0.98 | −10.4 | −7.8 | −8.8 | −4.6 |

TABLE IV-continued

|  | % $ZrSiO_4$ | K at 1 KHz | % DF | TC @ −55° C. | TC @ 85° C. | TC @ 105° C. | TC @ 125° C. |
|---|---|---|---|---|---|---|---|
| Example 26 | 0.75 | 3240 | 0.96 | −8.7 | −6.3 | −7.1 | −3.1 |
| Example 27 | 1.0 | 3058 | 0.95 | −8.2 | −5.3 | −6.0 | −2.4 |
| Example 28 | 1.5 | 2783 | 0.95 | −8.2 | −4.3 | −5.1 | −2.2 |
| Example 29 | 2.0 | 2555 | 0.97 | −8.1 | −4.2 | −5.1 | −2.9 |
| Example 30 | 3.0 | 2255 | 0.95 | −5.2 | −7.0 | −8.9 | −8.4 |
| Example 31 | 4.0 | 2114 | 1.03 | 0.9 | −14.0 | −18.1 | −19.7 |
| Example 32 | 5.0 | 2252 | 1.53 | −6.0 | −25.0 | −32.8 | −37.7 |

EXAMPLES 33 to 41

Using the same procedure as described in Examples 23 to 32, 8.0 grams of $ZrSiO_4$ was added to 800 grams of TAMTRON X7R412H powder and the mixture milled in the same way as described in Examples 1 to 12 except that after about every 2 hours of milling a small portion of the slurry was taken and dried into a powder. Disc capacitors were when prepared from the thus dried powder and tested in the same way as for Examples 1 to 12, Table V lists the results. It demonstrates that with the addition of $ZrSiO_4$, a X7R powder having a 0.7 micrometers average particle size and a stable TC can be obtained.

from Nuodex Co. Inc. New Jersey), 2597 ml ethanol, 270 ml toluene, and 372 grams Butvar B-76 vinyl resin (Butvar B-76 is a binder comprising a mixture of polyvinyl butyl, polyvinyl alcohol and polyvinyl acetate available from Monsanto Corp.).

The slurry was milled for 16 hours, discharged and filtered through a 44 micrometer screen. The slurry had a viscosity of about 1500 to 3000 centipoise and was then deaired and tape cast, in accordance with standard techniques known in the industry. The tape was cast to a thickness of about 30 to 37.5 micrometers. The tape was converted to MLCs having internal electrodes comprised of about 70 wt % palladium and 30 wt % silver. The capacitors

TABLE V

|  | Milling Time (Hr.) | Avg. Part Size (μm) | K at 1 KHz | % DF | TC@ −55° C. | TC@ 85° C. | TC@ 105° C. | TC@ 125° C. |
|---|---|---|---|---|---|---|---|---|
| Example 33 | 1 | 1.08 | 2999 | 0.93 | −8.4 | 0.0 | 1.3 | 8.3 |
| Example 34 | 2 | 1.01 | 2987 | 0.97 | −8.3 | −0.4 | 0.7 | 7.4 |
| Example 35 | 4 | 0.88 | 2996 | 0.96 | −7.96 | −1.09 | −0.1 | 6.1 |
| Example 36 | 6 | 0.80 | 3006 | 0.97 | −7.5 | −1.7 | −1.1 | 4.4 |
| Example 37 | 8 | 0.76 | 3033 | 0.97 | −7.9 | −2.7 | −2.5 | 2.4 |
| Example 38 | 10 | 0.74 | 3032 | 1.03 | −8.6 | −3.9 | −4.2 | −0.1 |
| Example 39 | 12 | 0.69 | 3060 | 1.03 | −9.0 | −5.0 | −5.6 | −2.2 |
| Example 40 | 16 | 0.62 | 3189 | 1.12 | −12.3 | −9.0 | −10.9 | −9.4 |
| Example 41 | 20 | 0.58 | 3340 | 1.22 | −18.7 | −13.6 | −17.1 | −17.6 |

EXAMPLES 42 to 47

650 grams of a uniformly blended ceramic composition TAMTRON X7R402H was prepared with an addition of 0.3 to 0.8 weight percent of $ZrSiO_4$ in the same way as described in Examples 1 to 12. The average particle size of the powders was about 0.7 micrometers. About 400 grams of the thus prepared 0.7 micrometer powder composition was added together with 218 grams of a binder solution made by uniformly mixing and dissolving 186 grams dioctylphthalate, 90 grams Nuostabe V-1444 (Nuostabe V-1444 is an alkali ion free organic solvent dispersing agent available were then preheated, or baked out, at 260° C. for 48 hours on a stabilized zirconia setter and then sintered at 1290° to 1340° C. for about one to four hours.

Six composition are listed in Table VI that show $ZrSiO_4$ levels varying from 0.3 to 0.8 weight percent. The MLC results of these six compositions are also listed in Table VI. It demonstrates that with 0.3 to 0.8 percent addition of $ZrSiO_4$ to a conventional K4000 X7R type dielectric powder a powder composition with a small particle size, such as 0.7 micrometer having a high dielectric constant, greater than 2500, and stable TC can be obtained.

TABLE VI

|  | Avg. Part. Size (μm) | % $ZrSiO_4$ | MLC K value | % DF | TC@ −55° C. | TC@ 85° C. | TC@ 105° C. | TC@ 125° C. |
|---|---|---|---|---|---|---|---|---|
| Example 42 | 0.7 | 0.3 | 3302 | 1.77 | 5.3 | −10.4 | −12.3 | −9.7 |
| Example 43 | 0.7 | 0.4 | 2896 | 1.69 | 5.1 | −9.4 | −11.1 | −8.4 |
| Example 44 | 0.7 | 0.5 | 2954 | 1.62 | 4.2 | −8.7 | −10.3 | −7.6 |
| Example 45 | 0.7 | 0.6 | 3461 | 1.91 | −2.9 | −10.2 | −12.9 | −11.6 |
| Example 46 | 0.7 | 0.75 | 2892 | 1.63 | 3.7 | −7.1 | −8.4 | −5.6 |
| Example 47 | 0.7 | 0.8 | 2913 | 1.85 | −0.8 | −9.8 | −11.6 | −9.2 |

|  | Avg. Part. Size (μm) | % $ZrSiO_4$ | MLC K | K plate K | RC @ 25° C. | RC @ 125° C. | BDV (v/25 μm) |
|---|---|---|---|---|---|---|---|
| Example 42 | 0.7 | 0.3 | 3302 | 3256 | 22200 | 3060 | 873 |
| Example 43 | 0.7 | 0.4 | 2896 | 3126 | 14600 | 3620 | 746 |

TABLE VI-continued

| Example 44 | 0.7 | 0.5 | 2954 | 3075 | 18500 | 3666 | 916 |
| Example 45 | 0.7 | 0.6 | 3461 | 3388 | 8070 | 3190 | 850 |
| Example 46 | 0.7 | 0.75 | 2892 | 2860 | 17300 | 3750 | 914 |
| Example 47 | 0.7 | 0.8 | 2913 | 3110 | 7700 | 3150 | 822 |

Figure 2:
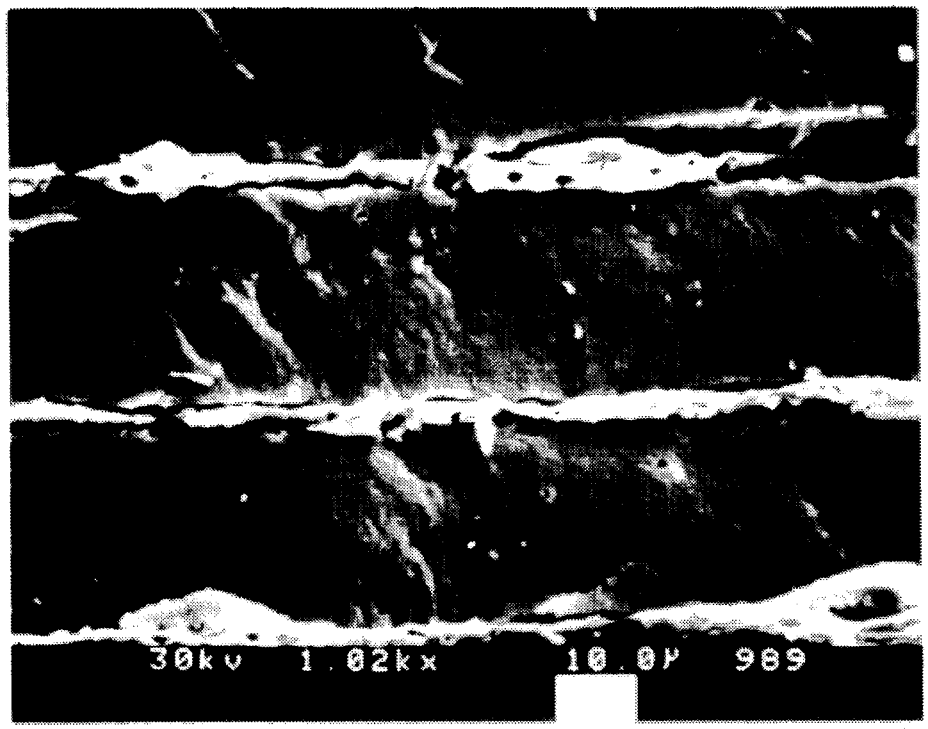
FIG. 2 is an SEM of a polished section of a MLC oxide with the composition of Examples 42.
Figure 3:
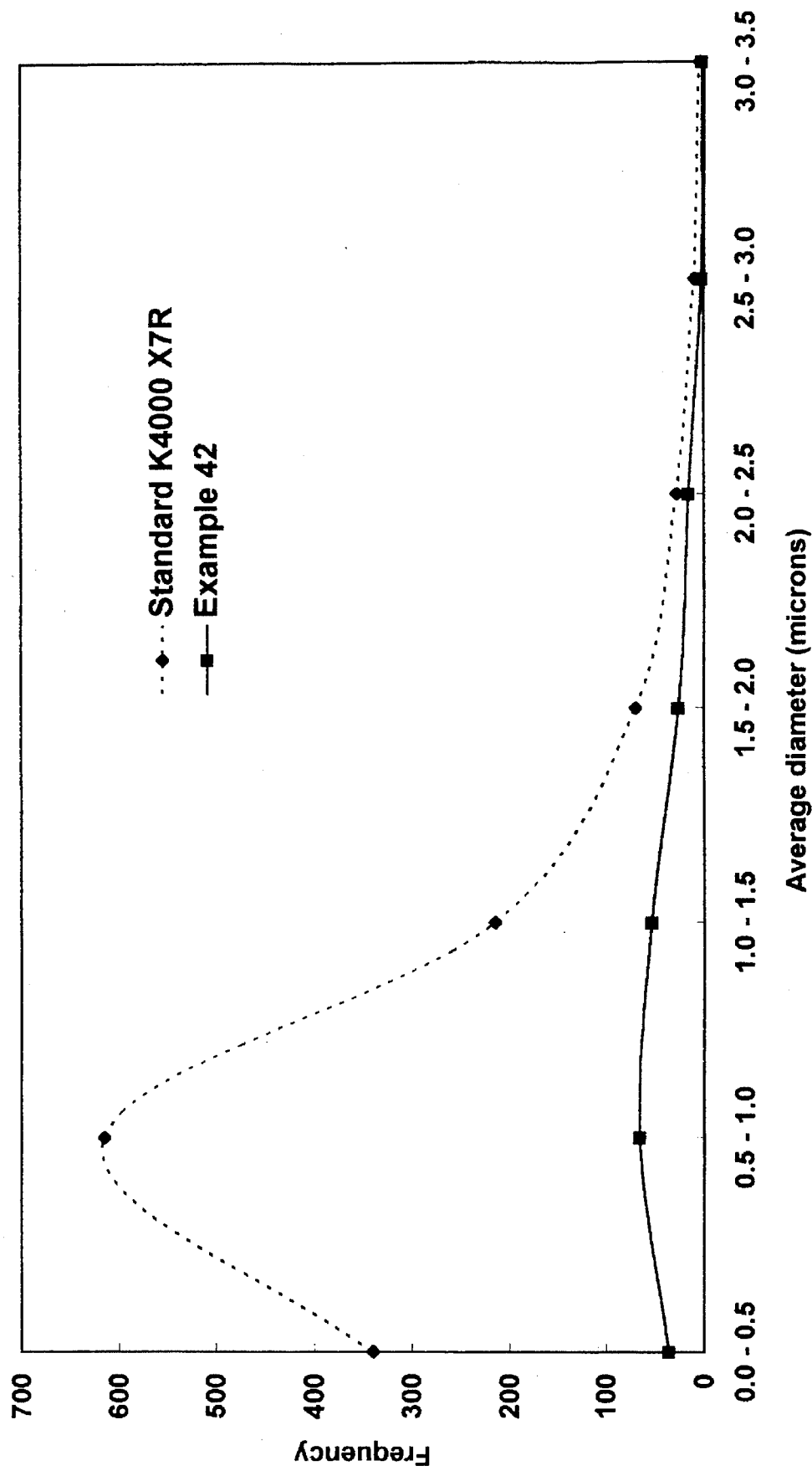
FIG. 3 is a comparison of the pore size distributions for the K4000 composition and the composition of Example 42.

Furthermore, MLCs made from powders such as Examples 42 to 47 have a superior microstructure with nearly zero internal porosity. Examples are illustrated in FIG. 1 which is a fracture surface view of an MLC made from a conventional K4000 X7R type powder, and in FIG. 2, which is a fracture surface view of an MLC made the powder of Example 42. The conventional K4000 X7R powder had a mean porosity determined by the method as described herein of 1.56% (standard deviation=0.18) and the low porosity powder made according to Example 42 had a mean porosity of 0.51% (standard deviation–0.15). The low values of standard deviation in each case indicates that these results are representative of the porosity in the samples. The pore size distributions for a similar cross sectional area of each sample are shown in FIG. 3. The low porosity composition of Example 42 has fewer pores and there are no pores >3.5 micrometers in diameter.

It is to be understood that the present invention is not limited to the specific embodiments described in the Examples. More specifically, although the Examples are illustrated using commercially available dielectric compositions such as TAMTRON X7R412H and TAMTRON X7R402H, it is to be understood that other compositions which have an X7R specification may also be used in the present invention. Furthermore, although most of the Examples illustrates the addition of $ZrSiO_4$ to the compositions it is to be understood that additions of $ZrO_2/SiO_2$, $Al_2O_3$ or $SiO_2$ may also be used.

We claim:

1. A sinterable ceramic composition which comprises a barium titanate based dielectric precursor powder which has a temperature coefficient of capacitance, TC, of ±15% over the temperature range −55° to 125° C., in admixture with from 0.25 to 2.0% by weight of an additive which is selected from the group consisting of $ZrSiO_4$, $Al_2O_3$, $SiO_2$, precursors therefor and mixtures thereof, the composition having an average particle size in a range of from 0.6 to less than 0.8 micrometers and, when fired, having a dielectric constant of above 2400, a TC of ±15% over a temperature range of −55° to +125° C. and a porosity of less than 0.7% with no pores greater than 3.5 micrometers average diameter.

2. A composition according to claim 1 which comprises from 0.3 to 1.0% of the additive.

3. A composition according to claim 1 which has an average particle size of about 0.7 micrometers.

4. A composition according to claim 1 which when fired has a dielectric constant in a range of from 2400 to 3100 at 25° C.

5. A composition according to claim 4 which when fired has a dissipitation factor of less than 2% and an insulation resistance and capacitance product of about 5000 ohm-farads at 25° C. and about 1000 ohm-farads at 125° C.

6. A composition according to claim 1 wherein the barium titanate precursor powder includes therein niobium pentoxide, cobalt oxide and manganese oxide.

7. A method for the preparation of a sintered composition having an average particle size in the range of from 0.6 to 0.8 micrometers and, when fired, having a dielectric constant of above 2500, a TC of ±15% over the temperature range −55° to 125° C. and a porosity of less than 0.7% with no pores greater than 3.5 micrometers, which method comprises milling a barium titanate precursor powder having a temperature coefficient of capacitance, TC, of ±15% over the temperature range −55° to 125° C. and having an average particle size of above 0.8 micrometers with from 0.25 to 2% by weight of an additive which is selected from the group consisting of $ZrSiO_4$, $Al_2O_3$, $SiO_2$, precursors therefor and mixtures thereof to an average particle size of from 0.6 to 0.8 micrometers.

8. A method according to claim 4 wherein the milling is carried out for a period of from 2 to 8 hours.

* * * * *